Figure 4:
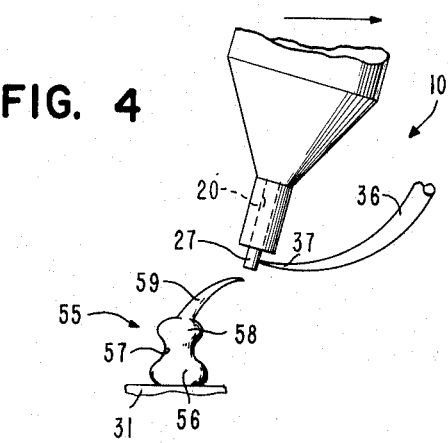

Dec. 14, 1965 R. J. KAWECKI 3,222,776
METHOD AND APPARATUS FOR TREATING MOLTEN MATERIAL
Filed Dec. 4, 1961 2 Sheets-Sheet 1
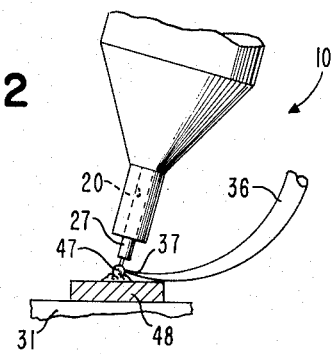
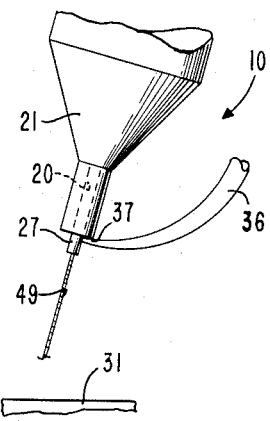
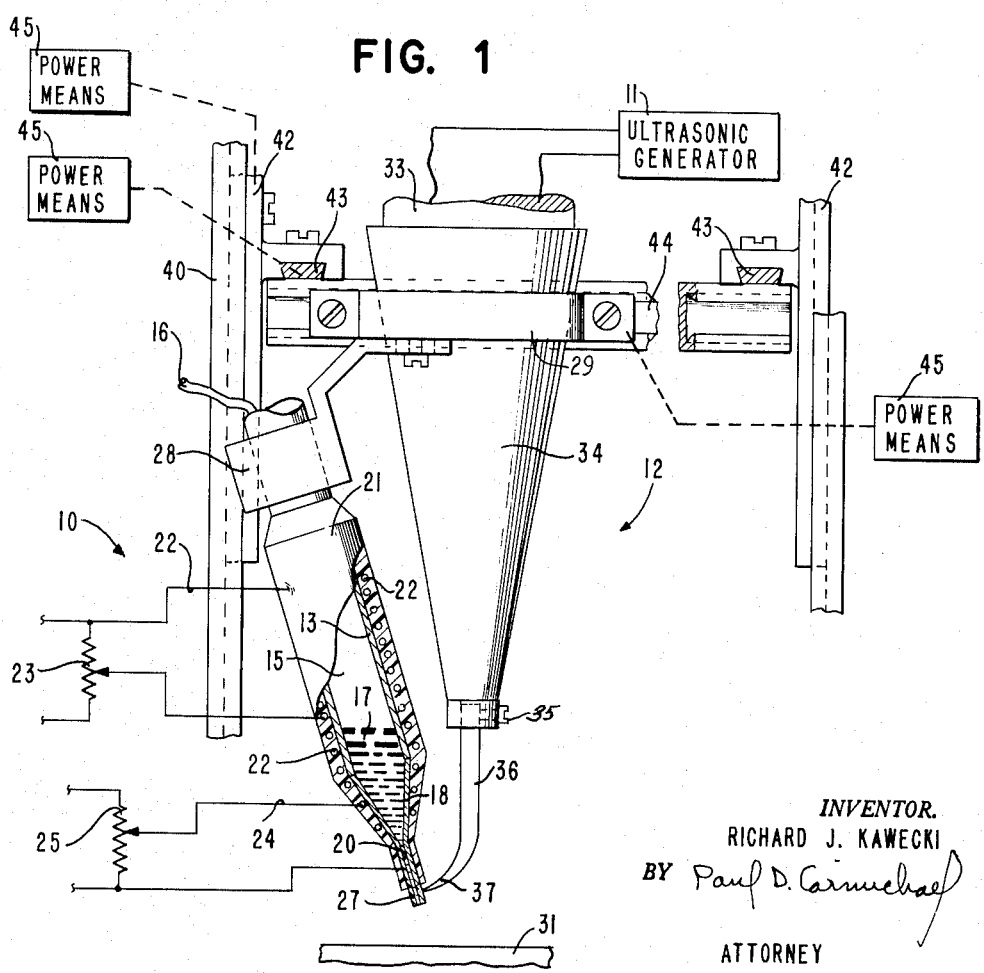
INVENTOR.
RICHARD J. KAWECKI
BY Paul D. Carmichael
ATTORNEY Dec. 14, 1965  R. J. KAWECKI  3,222,776
METHOD AND APPARATUS FOR TREATING MOLTEN MATERIAL
Filed Dec. 4, 1961  2 Sheets-Sheet 2

United States Patent Office

3,222,776
Patented Dec. 14, 1965

---

3,222,776
METHOD AND APPARATUS FOR TREATING MOLTEN MATERIAL
Richard J. Kawecki, Endicott, N.Y., assignor to International Business Machines Corporation, New York, N.Y., a corporation of New York
Filed Dec. 4, 1961, Ser. No. 156,834
15 Claims. (Cl. 29—503)

The present invention relates generally to the dispensing and forming arts and more particularly to the provision of an improved apparatus for and a method of treating molten materials.

It is well known to join a pair of workpieces by placing a quantity of molten solder at the joint between the workpieces. The molten solder solidifies to provide a mechanical and electrical bond between the two workpieces. The solder is provided at the joint by the use of a soldering iron or by dipping the workpieces in a bath of molten solder. A flux is usually employed for cleaning and preparing the surfaces of the workpieces adjacent the joint so that the solder adheres to the workpieces. Conventional soldering apparatus is not readily adapted for use where it is necessary to accurately and precisely control the amount of solder at the joint between the workpieces as, for example, in the soldering of very fine wires when mounting electronic components. Too large an amount of solder may overlap other wires and elements to provide undesired electrical connections while an amount of solder which is to small will not provide the required mechanical bond and electrical connection. The heat of the molten solder must be controlled within close tolerances to prevent burning of the fine wires. Further, the use of flux in the soldering operation is, in many cases, objectionable since all fluxes are to a certain extent corrosive and may damage the very fine leads.

Briefly, the present invention provides improved apparatus for and a method of treating a molten material wherein the quantity, the physical and metallurgical form and/or the rate at which the molten material is dispensed are accurately and precisely controlled. A heated reservoir maintains a quantity of the material in its molten state. A capillary sized discharge conduit, i.e. an opening which provides capillarity compatible with the molten material and conduit utilized, leads from the reservoir and is provided with independent heating means for controlling the temperature of the molten material. The size of the opening in the discharge conduit and the heating means therefor are so related that the molten material does not fall therefrom but is maintained in the discharge conduit due to surface friction and surface tension.

A probe is disposed in adjacent relation with respect to the end opening of the discharge conduit and ultrasonic vibrations are induced therein. This is accomplished by means of an ultrasonic generator acting through an electromechanical transducer, for example. When the probe is energized with ultrasonic vibrations, the surface tension is broken and the molten material is caused to flow from the discharge opening in a controlled manner. The positioning of the probe with respect to the discharge opening, the frequency of vibration and the amplitude of vibration control the form in and rate at which the molten material is dispensed. The molten material comes from the discharge tube in a fine liquid stream, as discrete drops or globules of predetermined volume, in a semisolid state or as a mist-like cloud. The dispensing of the molten material in a fine stream or in discrete globules or drops is highly advantageous in soldering operations since the flow of the solder to the workpieces is accomplished at a metered rate. The issuance of the material in a semisolid state provides a means for forming a workpiece whose shape and cross section can be varied in accordance with a preselected pattern during a treating operation. Means are provided for moving the apparatus with respect to the workpiece for this purpose.

It is the primary or ultimate object of the invention to provide a simplified method and apparatus for treating molten material so that the same is dispensed in a controlled and regulated manner.

Another object of the invention is to provide method and apparatus for treating a molten material wherein ultrasonic vibrations control the movement of the molten material through a restricted opening.

Yet another object of the invention is to provide method and apparatus for treating molten material wherein the molten material is discharged in any of a variety of physical forms. By proper adjustment of the heating means, the size of the discharge opening, the spacing of the probe and the frequency and amplitude of oscillation, the molten material is discharged as a thin liquid stream, as discrete globules of predetermined volume, in a semisolid extruded form or as a fine mist.

It is a further object of the invention to provide improved means for forming workpieces wherein the shape and cross sectional area of the workpiece vary throughout its length in accordance with a preselected pattern. By varying and controlling the movement of the apparatus with respect to the workpiece and the oscillations of the probe, workpieces of almost unlimited shape can be grown or extruded. The power and force associated with forging and hot upsetting methods are not required and the workpiece is not limited to a single cross sectional shape throughout its extent as is the case when conventional pressure extrusion techniques are employed.

Still a further object of the invention is to provide method and apparatus for dispensing molten material in a semisolid and continuous form wherein the resultant workpiece has properties which differ substantially from the properties of a similar workpiece formed by other means. For example, as will be hereinafter fully explained, the ultimate strength of a thin wire formed in accordance with the teachings of the present invention is much higher than the same property of a similar wire formed by other methods.

A still further object of the invention is to provide apparatus of the type above described which is characterized in its simplicity of construction and operation.

The foregoing and other objects, features and advantages of the invention will be apparent from the following more particular description of preferred embodiments of the invention as illustrated in the accompanying drawings.

Figure 7:
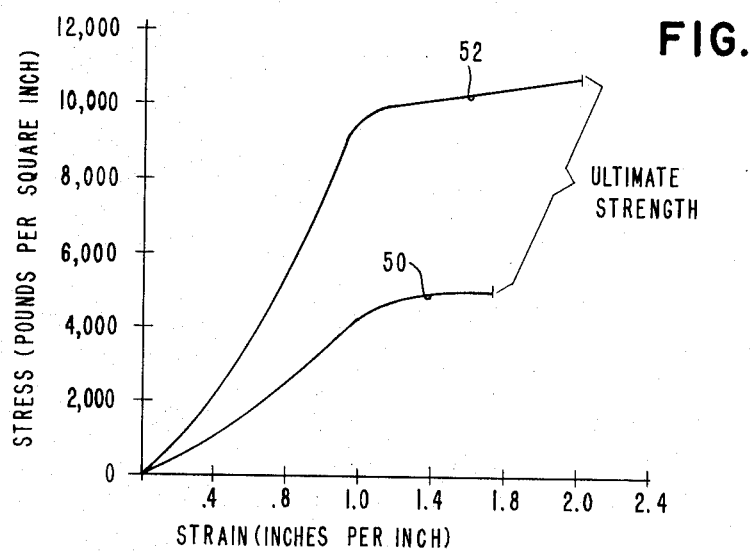

In the drawings:
FIGURE 1 is a side view, partially in section, showing apparatus for treating molten material in accordance with and employing the teachings of the present invention;
FIGURES 2–6 are enlarged fragmentary side views showing the use of the apparatus for various types of treating operations, and
FIGURE 7 is a graphical presentation of stress-strain curves showing the relationship between wire formed using the teachings of this invention and that formed by other methods.

Referring now to the drawings and initially to FIGURE 1 thereof, there is shown apparatus for treating molten material. The apparatus comprises a tool 10 for holding a quantity of the molten material, an ultrasonic generator 11 and transducing or transmitting means 12. The tool 10 has a cylinder 13 of stainless steel or other heat and corrosive resistant material whose internal opening forms the main portion of a reservoir or chamber 15 for the molten material. The upper end of the cylinder 13 is open so that solder wire 16 or the like can be fed thereinto. As will be hereinafter more fully explained, the solder wire 16 is melted to provide a molten batch or charge 17 at the lower end of the cylinder.

Attached to the lower end of the cylinder 13 is a funnel-shaped member 18 whose elongated and thin extension forms a discharge conduit 20 for the molten material. Wrapped about the cylinder 13 and embedded in insulating material 21 is a coil of high electrical resistance wire 22. The end terminals of the wire 22 are connected to one end terminal and the center tap of a potentiometer 23 which is in turn connected to a suitable source of electrical energy, not shown. Apparatus is provided for accurately controlling the temperature of the molten material in the main or body portion of the reservoir 15. In a similar manner, a high electrical resistance wire 24 encircles the discharge conduit 20 and is connected to potentiometer 25 to provide a separate means for controlling the temperature of the molten material in the discharge conduit.

The solder wire 16 is fed into the reservoir 15 where it is melted. The power supplied to wire 22 is regulated so that the solder is maintained in its molten state at the lower end of the cylinder. The temperature of the molten material in the discharge conduit 20 is normally maintained at a higher level due to the restricted size of the internal opening therein. The size of the opening in the discharge conduit is such that the molten material will not flow therethrough on its own accord. The molten material completely fills the conduit but the surface friction between the molten material and the internal sidewalls of the conduit and surface tension do not permit the molten material to drop or flow from the lower end of the discharge conduit. The temperature of the molten material in the discharge conduit is regulated in a manner consistent with the above and to prevent clogging of the conduit. The extreme lower end 27 of the discharge conduit 20 protrudes a short distance below the insulating material 21.

The upper end of the cylinder 13 is encircled by a split annular clamp 28 which is in turn movably attached to a mounting block 29. The arrangement is such that the tool 10 is maintained in generally slanted vertical relation with respect to a horizontal work surface 31.

The ultrasonic generator 11 may be of any type well known in the art for providing ultrasonic oscillations. For example, the ultrasonic generator used in one constructed embodiment of the invention is commercially available from Vibro-Ceramics Corporation, Metuchen, New Jersey, under their ultrasonic drill model number U-600. The ultrasonic generator may comprise means to vary the frequency of oscillation in the ultrasonic range (above 18,000 cycles per second) and means to control the amplitude of the oscillations.

The ultrasonic generator 11 is electrically connected with an electro-mechanical transducer 33, such as a block of barium titanate, for example, which converts the electrical oscillations to mechanical vibrations. One face of the transducer 33 rests against a truncated horn 34. The horn 34 is movably mounted with respect to the mounting block 29. In addition, as is obvious to those skilled in the art, shock mounting means, not shown, are provided between block 29 and horn 34 to mitigate and/or obviate vibrations being transferred to the cylinder 13 via clamp 28. Removably and adjustably received in a set screw mounting 35 at the lower end of the horn 34 is a porbe 36. The probe 36 may be an enlongated and thin curved stylus-like metal member whose free end portion is tapered to a point 37. As will be hereinafter more fully explained, the point 37 of the probe is disposed in adjacent relation with respect to the protruding end 27 of the discharge conduit 20 and this positioning, in combination with the frequency and amplitude of the oscillations and the temperature of the molten material, determines the physical form and rate at which the material is discharged from the conduit.

The mounting block 29 which carries the tool 10 and the transducing or transmitting means 12 is mounted for movement along three mutually perpendicular axes with respect to a supporting base 40 and the work surface 31. This is accomplished by a plurality of slides 42–44 and a separate powering or moving means 45 is provided for each of the slides. The lower end 27 of the discharge conduit 20 may be moved in any direction and in accordance with any preselected pattern with respect to the work surface 31 while still maintaining the relative positioning between the discharge conduit and the probe 36. However, the relative positioning can be changed independently of this movement since the annular clamp 28 holding the tool 10 is movably attached to the mounting block 29 and the probe 36 is adjustably received in the set screw mounting 35.

Considering now the operation of the apparatus above described, it will be assumed that it is desired to solder a fine copper wire 47 to a small copper land 48 as shown in FIGURE 2 of the drawings. Solder wire is introduced into the cylinder 13 and the potentiometer 23 is adjusted so that the wire is melted to provide a molten batch of the solder at the lower end of the cylinder. The solder within the discharge conduit 20 is also maintained in the molten state by appropriate setting of the center tap of the potentiometer 25. Although the discharge conduit is completely filled and a portion of the solder bulgingly extends outwardly slightly from the lower end 27, solder does not pass through the discharge conduit due to the size of the discharge opening and the accurate temperature control provided over the solder in this conduit.

The point 37 of the probe 36 is positioned slightly below and to one side of the lower end 27 of the discharge conduit 20. The powering means 45 are then actuated to lower the tool and the transducing means whereby the lower end of the discharge conduit is directly above the thin copper wire 47 with that portion of the solder extending outwardly of the discharge opening contacting the wire and the probe touches the copper land 48.

The ultrasonic generator 11 is energized for a short time interval to cause a fine stream of molten solder to issue from the lower end of the discharge conduit. The solder flows around and about the wire 47. After the required amount of solder has been discharged, the ultrasonic generator 11 is de-energized. The tool and the transducing means are then retracted upon proper actuation of the powering means 45. The solder hardens to complete the joint between the wire 47 and the land 48.

The solder passes from the discharge conduit 20 in a fine stream and at a relatively constant rate so that the total volume of solder discharged from the conduit is easily regulated by controlling the time of energization of the ultrasonic generator. It is believed that the ultrasonic generator 11 is de-energized. The tool and the workpieces due to physical contact between the probe and the copper land perform a cleaning function by breaking away oxide coatings in a manner similar to the use of flux. In any event, a strong mechanical bond having the required electrical characteristics is provided between the workpieces without the use of flux.

The ultrasonic vibrations of the point 37 of the probe 36 are induced in or transferred to the molten solder at the extreme lower end 27 of the discharge conduit 20.

Apparently, the ultrasonic vibrations in this portion of the molten solder causes cavitation or the formation of voids within the molten solder which extend through the surface thereof. Intense supersonic waves are developed at the discharge opening which impart forces to the molten solder sufficient to overcome the surface friction between the solder and the internal side walls of the discharge conduit and the surface tension of the molten solder. Regardless of the theory involved, the overall effect of the ultrasonic vibrations of the probe is to cause the molten solder to flow in a fine stream and at a relatively constant rate through the discharge conduit.

In a constructed embodiment of the invention as employed in a soldering operation similar to the one described above, the discharge opening at the lower end of the conduit had an inside diameter of about 0.006 of an inch while the point of the probe was positioned approximately 0.002 of an inch below the end of the discharge conduit and to one side thereof. A 60% tin and 40% lead solder was used and maintained at a temperature of 500 degrees Fahrenheit within the discharge conduit. The ultrasonic generator was set to produce oscillations at approximately a twenty-five kilocycle rate with a power output in the order of forty watts. This example should not be considered as in any manner limiting the teachings of the present invention. The size of the opening at the end of the discharge conduit, the amplitude and frequency of the ultrasonic vibrations, the particular molten material, the relative positioning of the probe and the discharge conduit, the temperature of the molten material in the chamber and the discharge conduit, etc. are selected as required for a given application consistent with the above-outlined method of operation.

The molten material can be discharged from the conduit in a semisolid state. The probe 36 is so positioned with respect to the extreme lower end 27 of the discharge conduit 20—touching the side of the conduit slightly above the end thereof—that the molten material flows in a thin stream from the discharge opening and solidifies in a continuous form. The frequency and amplitude of vibration and the temperature of the molten metal are regulated in a manner consistent with this method of operation. When the tool is positioned a sufficient distance above the working surface 31 so that the molten material solidifies and hardens before reaching the working surface, a continuous wire 49 is formed as is shown in FIGURE 3 of the drawings. The diametre of the extruded wire 49 for a given discharge opening can be varied by adjusting the ultrasonic generator and/or the temperature of the molten material within the discharge conduit. An increase in the temperature of the molten material and/or the frequency and amplitude of the ultrasonic vibrations of the probe causes the molten material to flow through the discharge conduit at a faster rate and provides a wire of smaller diameter.

A workpiece formed in accordance with the above has improved physical and metallurgical properties when compared with similar workpieces formed by other techniques. For example, in FIGURE 7 of the drawings, there is shown at 50 a curve of stress in pounds per square inch versus percent strain in inches per inch for commercially available 60% tin and 40% lead solder wire. The curve 52 depicts these relationships for wire formed from the same material by extruding in the manner outlined above. The ultimate strength of point of fracture for the wire formed by discharging the molten solder through the conduit 20 under the influence of ultrasonic vibrations occurring in the probe 37 is approximately 10,600 pounds per square inch while the same value for solder wire formed by other methods is about 5,000 pounds per square inch. The ultrasonic vibrations of the probe in combination with the passage of the molten material through the restricted opening of the discharge conduit apparently causes a change in the internal structure or organization of the material. As a result, the physical characteristics of a workpiece formed in this manner are greatly improved.

As indicated above, the frequency and amplitude of the ultrasonic vibrations and the temperature of the molten material in the discharge conduit are adjusted to control the diameter of the formed or extruded wire. By effecting relative movement between the apparatus and the working surface in combination with the above control features, a workpiece whose shape and cross sectional area varies throughout its extent in accordance with a preselected pattern can be formed. For example, a workpiece 55 as shown in FIGURE 4 of the drawings is formed by lowering the tool to a position immediately above the working surface and energizing the ultarsonic generator to discharge the molten material until the bulbous lower end 56 of a workpiece has gathered.

The neck portion 57 of the workpiece is formed by retracting the apparatus vertically at a controlled rate upon proper actuation of a powering means 45. The rate of vertical retraction is retarded after the neck portion is formed to allow for the growth of the rounded head portion 58. The apparatus is then moved transversely and vertically at a rapid rate to provide a thin and tapered extension 59. A workpiece 55 has been disclosed for purposes of illustration only since it was possible to fabricate workpieces of almost unlimited shape. This is accomplished by controlling the rate and path of movement of the apparatus, the positioning of the probe with respect to the discharge conduit, the frequency and amplitude of the ultrasonic vibrations, the temperature of the material, etc.

Figure 5:
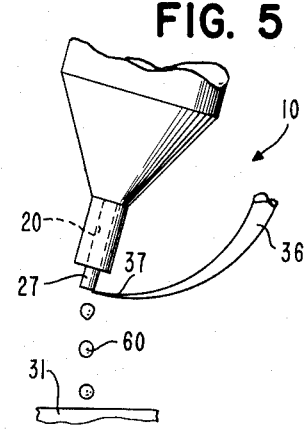
Figure 6:
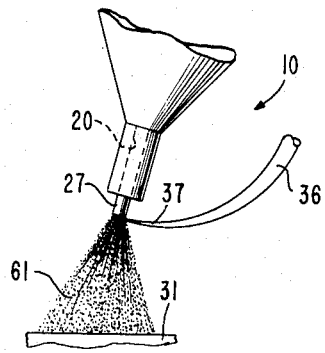

The apparatus is also capable of discharging the molten material as discrete drops or globules. As shown in FIGURE 5 of the drawings, the probe 36 is disposed in adjacent touching relation with the discharge conduit at the extreme lower end thereof. The ultrasonic generator is adjusted to provide a relatively low power output whereby the molten material is discharged as spherical and discrete drops or globules 60. Such a method of operation is highly advantageous as, for example, where it is desired to form spheres of metal material. The apparatus is positioned a considerable distance above the supporting surface so that the drops 60 harden while dropping from the end of the discharge conduit.

A fine mist or spray 61 of the molten material is provided by positioning the probe with respect to the discharge conduit in a manner similar to that disclosed in connection with the issuance of the molten material as discrete drops and increasing the frequency of amplitude of vibration. The size of the particles in the mist or spray is controlled by the temperature of the molten material and the frequency and amplitude of the ultrasonic vibrations of the probe. A predetermined pattern of solder can be provided on a surface with the use of a template or mask.

In the disclosed embodiments of the invention, the probe 36 has an end portion which is tapered to a fine point. Other types of probes can be employed. For example, the sharp point may be blunted or flattened or the probe may have a bifurcated end portion. In the latter case, the end of the discharge conduit would be nestingly received between the bifurcations of the probe. The apparent optimum design limitation for the probe is that the same be relatively thin with respect to the outside diameter of discharge conduit for concentrating and inducing ultrasonic vibrations in the molten material at the discharge opening of the conduit. It is also possible to pressurize the molten material in the chamber. A force is exerted on the molten material which tends to move the same through the discharge conduit although the molten material is not discharged until ultrasonic vibrations are induced in the probe. An inert gas may be employed with molten material which would react with the atmosphere. Further, the material may be introduced into the chamber in its molten state rather than in wire form.

It should now be apparent that the objects initially set forth have been accomplished. Of particular importance is the provision of apparatus for and a method of treating molten material wherein the same is discharged at a controlled rate and in a desired physical form by the use of ultrasonic oscillations. The positioning of the probe, the frequency and amplitude of oscillation, the temperature of the molten material and the relative movement between the apparatus and a workpiece are all regulated to provide a desired result. When the molten material issues from the discharge conduit in a semisolid state, a workpiece of almost unlimited preselected shape can be formed and the physical properties of the workpiece are improved.

While the invention has been particularly shown and described with reference to preferred embodiments thereof, it will be understood by those skilled in the art that the foregoing and other changes in form and details may be made therein without departing from the spirit and scope of the invention.

What is claimed is:
1. Apparatus for treating molten material comprising:
   a reservoir adapted to hold a quantity of molten material;
   first heating means for said reservoir;
   means to control said first heating means to maintain the material in said reservoir in its molten state;
   a discharge conduit of capillary size leading from said reservoir and providing a discharge opening for said molten material;
   second heating means for said discharge conduit;
   means to control said second heating means to regulate the temperature of the molten material in said conduit;
   a probe disposed in mechanical energy transferring relation to the lower end portion of said discharge conduit;
   means to induce ultrasonic oscillations in said probe; whereby said molten material is caused to pass from said discharge conduit when said probe is oscillated.
2. Apparatus according to claim 1 further comprising:
   means to regulate the type of discharge of the molten material from said conduit and the form in which said material is discharged; and
   said means to regulate comprising means to adjust the frequency and amplitude of said ultrasonic oscillations of said probe.
3. Apparatus for treating molten material comprising:
   a reservoir adapted to hold a quantity of molten material;
   a discharge conduit of capillary size leading from said reservoir and providing a discharge opening for said molten material;
   means for controlling the temperature of said molten material in said discharge conduit;
   a probe having an end portion disposed in mechanical energy transferring relation to the lower end of said discharge conduit;
   means to induce ultrasonic oscillations in said probe; and
   said molten material passing from said discharge opening when ultrasonic oscillations are induced in said probe.
4. Apparatus for treating molten material comprising:
   a reservoir for holding a quantity of molten material;
   a discharge conduit of capillary size leading from said reservoir and providing a discharge opening for said molten material;
   a probe having an end portion disposed in mechanical energy transferring relation with respect to the lower end of said discharge conduit;
   means to induce ultrasonic oscillations in said probe; and
   said molten material passing from said discharge opening when ultrasonic oscillations are induced in said probe.
5. Apparatus according to claim 4 further comprising:
   means to control the frequency and amplitude of oscillation of said probe.
6. Apparatus according to claim 4 further comprising:
   means to adjust the relative position of said end portion of said probe with respect to said discharge opening.
7. Apparatus according to claim 4 further comprising:
   a workpiece supporting surface; and
   means to effect relative movement of said discharge opening with respect to said supporting surface in accordance with a preselected pattern during a treating operation.
8. Apparatus according to claim 4 wherein;
   said end portion of said probe is positioned slightly below and to one side of said discharge opening; and
   said molten material passing from said discharge opening in a fine molten stream when ultrasonic oscillations are induced in said probe.
9. Apparatus according to claim 4 wherein;
   said end portion of said probe is positioned in touching relation with said discharge conduit a small distance from said discharge opening; and
   said molten material passing from said discharge opening in a semisolid state when ultrasonic oscillations are induced in said probe.
10. Apparatus according to claim 4 wherein;
    said end portion of said probe is positioned in touching relation with said discharge conduit at said discharge opening; and
    said molten material passing from said discharge opening as discrete globules when ultrasonic oscillations are induced in said probe.
11. Apparatus for treating molten material comprising:
    a reservoir for holding a quantity of molten material;
    a discharge conduit of capillary size leading from said reservoir and providing a discharge opening for said molten material;
    a probe having an end portion disposed in mechanical energy transferring relation with respect to the lower end of said discharge conduit;
    means to adjust the relative positioning of said end portion of said probe and said lower end of said discharge conduit;
    means to induce ultrasonic oscillations in said probe to cause the discharge of said molten material from said discharge conduit; and
    means to effect movement of said discharge conduit and said probe in accordance with a preselected pattern independently of said means to adjust the positioning of said end portion of said probe and said lower end of said discharge conduit.
12. The method of forming a workpiece on a supportable base from a molten material comprising the steps:
    introducting a quantity of molten material into discharge conduit of capillary size having a discharge opening;
    subjecting the molten material at said discharge opening to ultrasonic oscillations of a frequency and amplitude to cause the material to pass from said discharge opening; and
    varying at least one of the following parameters in a predetermined manner, to wit: the temperature of said molten material, the amplitude of said ultrasonic oscillations, the frequency of said ultrasonic oscillations, and the relative movement between said base and said discharge opening in accordance with a predetermined pattern to provide a preselected shape.
13. The method of treating molten solder for the joining of at least two bodies comprising the steps:
    introducing a quantity of molten solder into a discharge conduit of capillary size having a discharge opening;
positioning a probe in adjacent relationship with respect to said discharge opening;
touching at least one of said bodies with said probe;
introducing the ultrasonic oscillations in said probe to cause the molten solder to pass from said discharge opening; and
establishing mechanical contact between at least one of the bodies and the molten solder adjacent to the discharge opening to flow solder about said bodies to effect thereby the joining.

14. Apparatus according to claim 3 wherein said molten material is maintained under pressure in said reservoir, said pressure being insufficient to discharge said molten material until said ultrasonic oscillations are induced in said probe.

15. Apparatus according to claim 3 wherein said conduit has a thin and elongated configuration, and said end portion of said probe has a bifurcated configuration, said conduit being adapted to be received between the bifurcations of said probe.

References Cited by the Examiner

UNITED STATES PATENTS

| | | |
|---|---|---|
| 2,116,367 | 5/1938 | Smith. |
| 2,382,187 | 8/1945 | Vang. |
| 2,397,400 | 3/1946 | Barwich. |
| 2,408,627 | 10/1946 | Green _____ 22—216 |
| 2,512,743 | 6/1950 | Hansell. |
| 2,889,580 | 6/1959 | Wald et al. _____ 241—1 XR |
| 3,014,255 | 12/1961 | Bussard et al. _____ 266—42 XR |

FOREIGN PATENTS

| | | |
|---|---|---|
| 259,624 | 10/1926 | Great Britain. |
| 875,035 | 8/1961 | Great Britain. |

JOHN F. CAMPBELL, *Primary Examiner.*